United States Patent [19]

Kazami et al.

[11] 4,362,369

[45] Dec. 7, 1982

[54] CAMERA HAVING A DATA PHOTOGRAPHING DEVICE

[75] Inventors: Kazuyuki Kazami; Nobuyoshi Hagyuda, both of Tokyo, Japan

[73] Assignee: Nippon Kogaku K.K., Tokyo, Japan

[21] Appl. No.: 190,413

[22] Filed: Sep. 24, 1980

[30] Foreign Application Priority Data

Oct. 8, 1979 [JP] Japan .................................. 54/128833

[51] Int. Cl.³ .............................................. G03B 17/24
[52] U.S. Cl. .................................... 354/106; 354/127; 354/105
[58] Field of Search ............... 354/127, 128, 105, 106, 354/107, 109

[56] References Cited

U.S. PATENT DOCUMENTS 4,062,026 12/1977 Fujita .................................. 354/106
4,085,412 4/1978 Yoshino ............................... 354/106
4,181,416 1/1980 Ohtaki et al. ........................ 354/106

*Primary Examiner*—Russell E. Adams
*Attorney, Agent, or Firm*—Fitzpatrick, Cella, Harper & Scinto

[57] ABSTRACT

In a camera having a flash unit for object and a data photographing device, the flash unit including means for detecting the light emission capable condition of a flash tube, the data photographing device having an optical system for imaging onto a film the light beam from information display means including a light source, there are provided drive means for turning on the light source for the data photographing device in synchronism with the output of the detecting means of the flash unit, and means for directing the light from the light source to the outside of the camera so that said light can be observed.

5 Claims, 4 Drawing Figures

CAMERA HAVING A DATA PHOTOGRAPHING DEVICE

BACKGROUND OF THE INVENTION

1. Field of the Invention

This invention relates to a camera having a flash unit including flash capable condition display means and a data photographing device, and more particularly to such a camera using a common light source therefor.

2. Description of the Prior Art

Cameras containing therein a light source for displaying the flash capable condition of a flash unit, namely, the charged-up condition of a main capacitor, have been increasing. Also, cameras provided with a data photographing device for recording on a film various types of information regarding photography have come into wide use.

SUMMARY OF THE INVENTION

It is an object of the present invention to provide a camera in which the light source for displaying the light emission capable condition of a flash unit is utilized as the light source for data photographing from the viewpoint of the desire for smaller size and lower cost of the camera.

The invention will become fully apparent from the following detailed description thereof taken in conjunction with the accompanying drawings.

DESCRIPTION OF THE PREFERRED EMBODIMENTS

Embodiments of the present invention will hereinafter be described with reference to the drawings.

Figure 1:
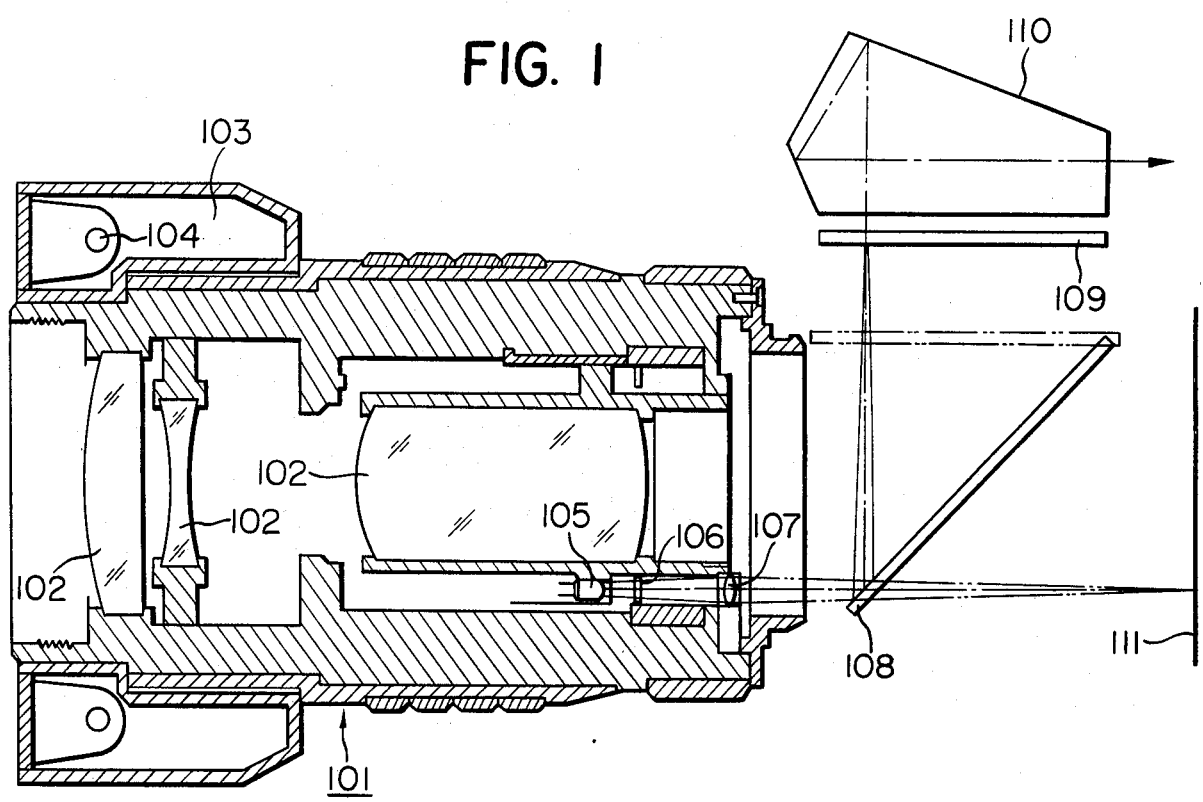
FIG. 1 shows the optical structure of a camera including a flash unit and a data photographing device according to an embodiment of the present invention.

Referring to FIG. 1, there is illustrated the optical construction of a flash unit and a data photographing device. An electronic flash unit 103 is mounted on the outer periphery of the fore end portion of the lens barrel 101 of a camera supporting a phototaking lens system 102 therein. The electronic flash unit 103 includes a ring-like flash discharge tube 104 disposed so as to surround the outer periphery of the lens barrel 101. An LED (light-emitting diode) 105 adapted to be turned on when the main capacitor of the flash unit 103 has been charged up and the flash discharge tube 104 becomes capable of emitting light, is positioned near the mount portion of the lens barrel 101. This LED 105 irradiates a data film 106 having a recorded data and is used as the light source of the data photographing device. The recorded data of the data film 106 includes, for example, the photographing magnification of the lens system 102, date, etc. The light from the LED 105 having passed through the data film 106 passes through an imaging lens 107 and emerges from the mount of the lens barrel and is reflected by the mirror 108 of the single lens reflex camera, whereafter it is imaged on a focusing plate 109. Accordingly, during turn-on of the LED 105, the photographer can know the light-emission capable condition of the flash unit 103 transmitted to the viewfinder through a prism 110 and the content of data to be photographed. When the mirror 108 is moved up as indicated by phantom line upon shutter release, a film 11 is exposed to the object image by the lens system 102 and the data of the data film 106 by the imaging lens 107.

Figure 2:
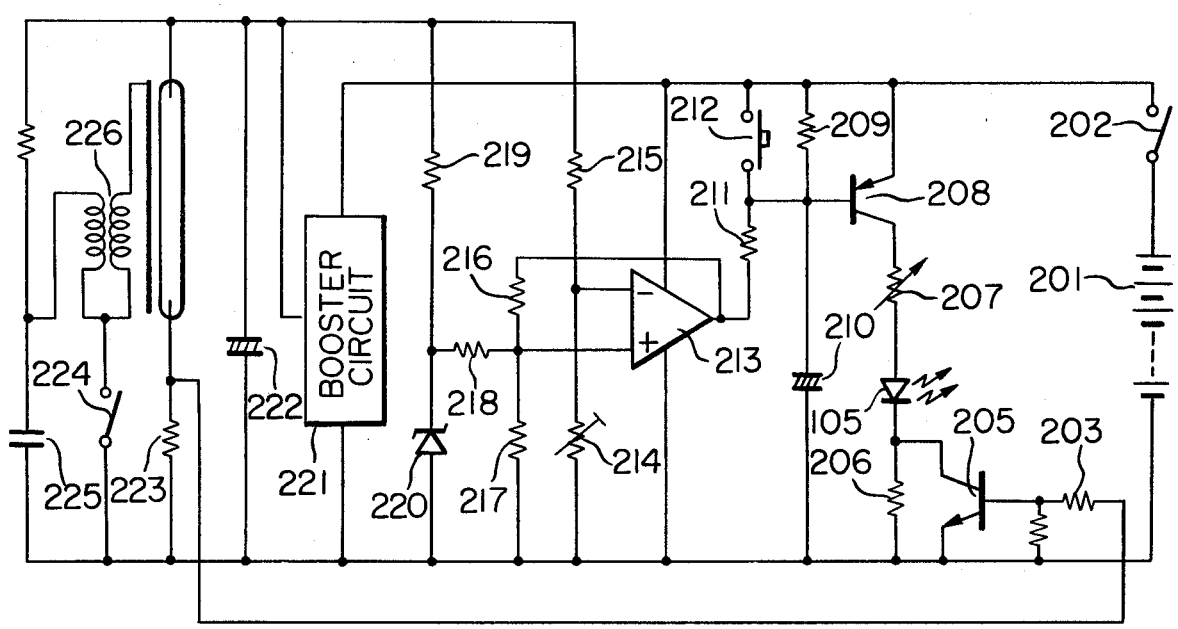
FIG. 2 diagrammatically shows an embodiment of the electric circuit in the camera according to the present invention.

In FIG. 2, when a main switch 202 series-connected to a power source 201 is closed, a voltage boosted by a booster circuit 221 is charged into a main capacitor 222 in the flash unit 103. A reference voltage is made from this charging voltage by resistors 217, 218, 219 and a Zener diode 220, and is applied to the non-inverting input terminal of a comparator 213. On the other hand, a voltage divided by a regulating resistor 214 is applied to the inverting input terminal of the comparator 213 so that the charging voltage of the main capacitor 222 becomes the same as said reference voltage when the flashing capable voltage has been reached. A resistor 216 renders, at that point of time, the non-inverting input higher than the inverting input to prevent the output of the comparator 213 from becoming unstable at the start of the charging, and also provides the output with a hysteresis. It is to be understood that the output of the comparator 213 assumes a low level when the inverting input is greater than the non-inverting input (during the flash capable condition), and assumes a high level when the inverting input is smaller than the non-inverting input (during the flash incapable condition).

When the charging of the main capacitor 222 progresses and the inverting input voltage divided by a resistor 215 and regulating resistor 214 exceeds the reference voltage and the flash capable condition is reached, the output of the comparator 213 changes from the high level to the low level and a transistor 208 is turned on by the bias provided by resistors 209 and 211. Thus, a current flows through the transistor 208, resistor 207, LED 105 and resistor 206 to turn on the LED 105 in the lens barrel 101 and the data film 106 is illuminated within viewfinders 109, 110, thereby displaying the flashing capability. Accordingly, the photographer can readily confirm the flashing capability without averting his eye from the viewfinder and at the same time, can confirm the data to be photographed.

The photographing of the photography data into the film surface is effected in the following manner. When a shutter release button, not shown, is depressed, the mirror 108 of FIG. 1 is moved up and thereafter, when the shutter is opened, a synchroswitch 224 is closed and the charge in a capacitor 225 flows to a trigger coil 226 to ionize the flash discharge tube 104 and the discharging current of the capacitor 222 flows to the flash discharge tube 104 to cause the tube 104 to emit a flashlight. Part of this current flows to a transistor 205 through a current limiting resistor 203 to turn on this transistor. Thereupon, the resistor 206 is short-circuited and therefore, a current greater than during the flash emission flows to the LED 105. Thus, the data on the data film 106 is photographed onto film 111. In this manner, only during the data photographing, the resistor 206 series-connected to the LED 105 is short-circuited, whereby during observation of the flash capable condition, a slight current necessary therefor can flow to the LED 105 and during the data photographing, a current necessary therefor can flow. A variable resistor 207 is one whose resistance is variable with the film speed information, and this variable resistor limits the current so that the LED 105 can supply a quantity of light corresponding to the film speed. Though, in this case, it is also possible to make the variable resistor 207 fixed and to provide a mechanism for limiting the necessary quantity of light in the data photographing optical system for the film speed.

When the data photographing is unnecessary, by depressing a switch 212, the transistor 208 is turned off and the LED 105 is turned off and the photography data is not photographed.

A capacitor 210 is for holding the base potential of the transistor 208 for a predetermined time in order to avoid that during the flashing, the voltage of the main capacitor 222 drops to cause the output of the comparator 213 to change to the high level and turn off the transistor 208 to make the data photographing impossible.

In the circuit of FIG. 2, the value of the variable resistor 207 is varied in accordance with the setting of the film speed and therefore, the flash capable condition within the viewfinder 109, 110 and the brightness of the display of the data are varied in accordance with the speed of the film used and this is not preferable.

Figure 3:
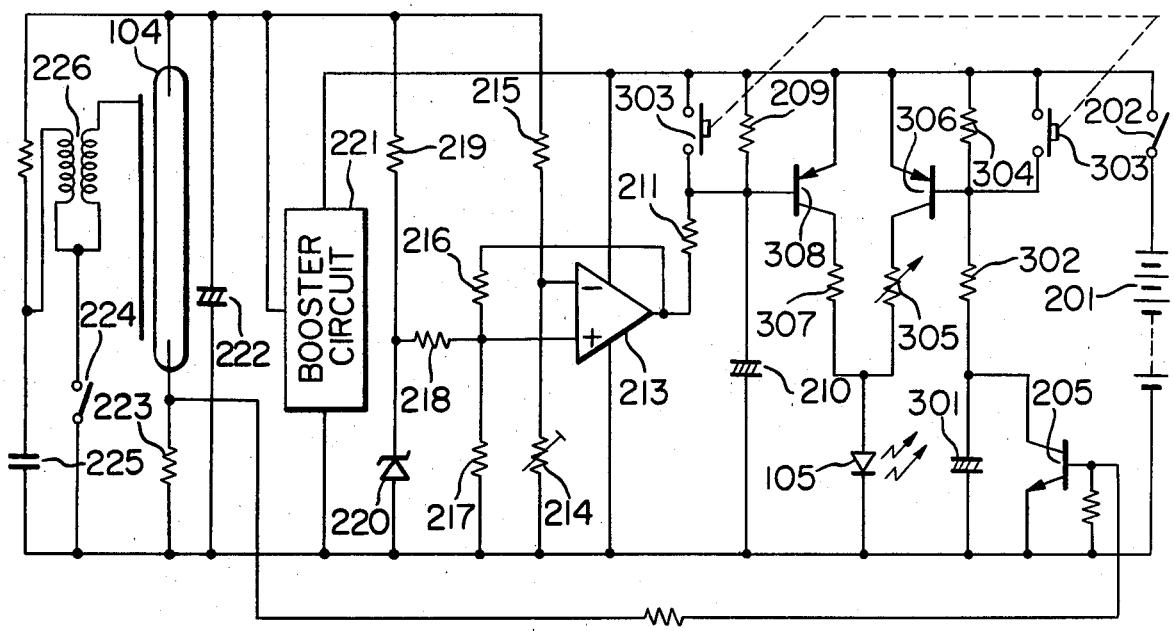
FIG. 3 diagrammatically shows another embodiment of the electric circuit.

The circuit of FIG. 3 solves this problem. In FIG. 3, circuit elements functionally similar to those of FIG. 2 are given reference numerals similar to those in FIG. 2.

A transistor 306 and a film speed setting variable resistor 305 are parallel-connected to a transistor 308 controlled by the output of comparator 213 and to a resistor 307. An LED 105 is series-connected to this parallel circuit 308, 307, 306, 305.

In the condition before the flashing is started, the transistor 308 is in its ON state but the transistor 306 is in its OFF state due to resistors 302, 304 and capacitor 301 and so, a predetermined current having passed through the transistor 308 and resistor 307 is supplied to the LED 105. Accordingly, during the observation of the flash capable condition, display of a predetermined brightness is effected independently of the set film speed.

During the data photographing, the transistor 205 is turned on as previously described, whereby the transistor 306 is turned on and a current passing through the transistor 306, resistor 305, transistor 308 and resistor 307 is supplied to the LED 105, which thus emits an intensity of light corresponding to the setting of the film speed.

Thus, during the data photographing, the sum of the collector currents of the transistors 306 and 308 flows to the LED 105 and therefore, during the data photographing, the LED 105 assumes a brightness higher than that during the observation. Also, when the data photographing is unnecessary, interlocking switches 303 and 303' may be closed and both of the transistors 308 and 306 may be turned off.

The turn-on of transistor 205 may be effected in synchronism with flash photography and therefore, for example, may be directly associated with the closing of the synchroswitch 224.

The data to be photographed need not always be photographed from the data film 106 as in the embodiment, but for example, the light-emitting member 105 itself may be caused to emit a pattern as by using seven-segment elements of LED.

In the embodiments so far described, the data has not been photographed by closing data photography releasing switches 212, 303, but in this case, when these switches have been closed, the information in the viewfinder is also turned off and also, the shutter release of the camera must be driven with these releasing switches remaining closed.

Figure 4:
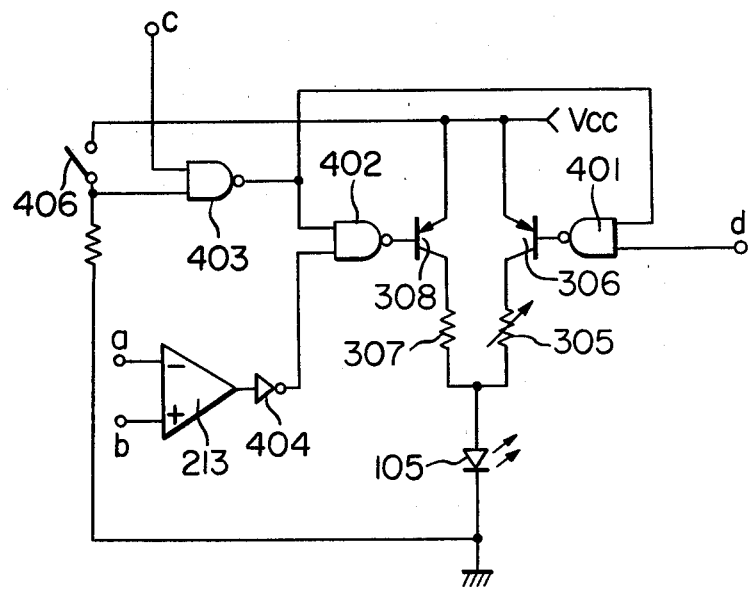
FIG. 4 diagrammatically shows still another embodiment of the electric circuit.

The embodiment of FIG. 4 solves these problems. A voltage resulting from suitably dividing the charging voltage of the main capacitor, as in the circuit of FIG. 2, and a reference voltage are applied to the input terminals a and b, respectively, of comparator 213. A switch 406 is a data photography releasing switch and is opened normally, i.e. during the data photographing and is closed during the release of the data photographing. By this, a signal of low level is normally applied to one input of a NAND gate 403, and a signal of high level is applied to said one input of the NAND gate 403 during the release of the data photographing. It is to be understood that another input of the NAND gate 403 has its input level varied in response to the shutter release operation of the camera and normally assumes a low level and assumes a high level as soon as the forward shutter curtain begins to move. Accordingly, during the normal mode (data photographing mode), the output of the NAND gate 403 assumes the high level irrespective of shutter release, and during the data photography release mode, the output of the NAND gate 403 assumes the low level when the shutter is released.

The output of the NAND gate 403 provides one input of a NAND gate 402, and the output of an inverter 404 is applied to another input of the NAND gate 402. When the charging voltage of the main capacitor is a flash capable voltage, the output of comparator 213 is at the low level and therefore, the output of the inverter 404 assumes the high level. Accordingly, when, in the data photographing mode, the output of the NAND gate 403 assumes the high level and the output of the inverter 404 assumes the high level, the output of the NAND gate 402 assumes the low level and the transistor 308 is turned on to turn on the LED 105.

Also, a light emission starting signal is applied as the high level to one input of a NAND gate 401, and, in the data photographing mode, another input of the NAND gate 401 assumes the high level and therefore, simultaneously with the light emission, the output of the NAND gate 401 assumes the low level and the transistor 306 is turned on to permit a current to be supplied to the LED 105, thereby effecting the data photographing.

Next, in the data photography release mode, one input of the NAND gate 403, namely, that input which is adjacent to a switch 406, is at the high level and thus, the output of the NAND gate 403 depends on another input c. Before the release of the shutter, the input c is at the low level and therefore, the NAND gate 403 and the NAND gate 402 operate as in the normal data photographing mode and the LED 105 is turned on to effect the display of the flash capability and the display of the data within the viewfinder, but when the shutter is released, the input c assumes the high level and the output of the NAND gate 403 assumes the low level, so that the outputs of the NAND gate 402 and NAND gate 401 assume the high level and the LED 105 is turned off, and the data photographing is not effected.

Thus, according to the above-described construction, where it is not necessary to photograph the data, the release switch 406 should only be closed and even in such condition, the display within the viewfinder can be confirmed.

We claim:

1. In a camera having a flash unit for illuminating an object to be imaged onto a film by a phototaking lens, a movable mirror for directing the light from said phototaking lens to a viewfinder during observation and for directing said light onto the surface of the film during photography and a data photographing device provided in structural association with said phototaking lens, said flash unit including a flash tube and means for detecting the light emission capable condition of said flash tube, said data photographing device including information display means having a light source, and an optical system for imaging onto said film the light beam from said information display means, the improvement comprising:
    drive means for turning on the light source of said data photographing device in response to the detection of the detecting means of said flash unit; and
    means for directing the light from said light source to said mirror so that said light can be observed.

2. In a camera having a flash unit for illuminating an object to be imaged onto a film by a phototaking lens and a data photographing device, said flash unit including a flash tube and means for detecting the light emission capable condition of said flash tube, said data photographing device including information display means having a light source, and an optical system for imaging onto said film the light beam from said information display means, the improvement comprising:
    drive means for turning on the light source of said data photographing device in response to the detection of the detecting means of said flash unit, said drive means including:
    means responsive to the output of said detecting means to supply a current to said light source and means for varying said current in response to the operation for data photographing to provide a sufficient quantity of light to expose the film to the information included in the light beam from said information display means; and
    means for directing the light from said light source to the outside of the camera so that said light can be observed.

3. A camera according to claim 2, wherein said means for varying said current is operable in synchronism with the light emission of said flash tube.

4. A camera according to claim 2, wherein said drive means further includes means for varying said current corresponding to the speed of said film.

5. In a camera having a flash unit for illuminating an object to be imaged onto a film by a phototaking lens and a data photographing device, said flash unit including a flash tube and means for detecting the light emission capable condition of said flash tube, said data photographing device including information display means having a light source, and an optical system for imaging onto said film the light beam from said information display means, the improvement comprising:
    drive means for turning on the light source of said data photographing device in response to the detection of the detecting means of said flash unit;
    means for directing the light from said light source to the outside of the camera so that said light can be observed; and
    data photography releasing means operable so as to forcibly prevent the operation of said drive means, said releasing means including operating switch means, synchronizing means operatively associated with the phototaking operation of said camera, and gate means for effecting said prevention when it receives both the output of said operating switch means and the output of said synchronizing means.

* * * * *

UNITED STATES PATENT AND TRADEMARK OFFICE
CERTIFICATE OF CORRECTION

PATENT NO. : 4,362,369
DATED : December 7, 1982
INVENTOR(S) : KAZUYUKI KAZAMI, ET AL.

It is certified that error appears in the above-identified patent and that said Letters Patent is hereby corrected as shown below:

Column 2, line 7, "11" should read --111--;
line 8, after "and" insert --to--.

Signed and Sealed this

Fifth Day of April 1983

[SEAL]

Attest:

GERALD J. MOSSINGHOFF

Attesting Officer        Commissioner of Patents and Trademarks